(12) United States Patent
Goswami et al.

(10) Patent No.: US 11,449,535 B2
(45) Date of Patent: Sep. 20, 2022

(54) GENERATING CONVERSATIONAL INTERFACES BASED ON METADATA

(71) Applicant: ServiceNow, Inc., Santa Clara, CA (US)

(72) Inventors: Shouvik Goswami, Hyderabad (IN); Harshvardhan Prasad, Hyderabad (IN); Varun Tayal, Hyderabad (IN); Anurag Vesangi, Hyderabad (IN); Akshay Kumar Vyasabhattu, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 71 days.

(21) Appl. No.: 16/927,203

(22) Filed: Jul. 13, 2020

(65) Prior Publication Data
US 2022/0012273 A1    Jan. 13, 2022

(51) Int. Cl.
*G06F 16/00* (2019.01)
*G06F 16/33* (2019.01)
(Continued)

(52) U.S. Cl.
CPC ........ *G06F 16/3344* (2019.01); *G06F 16/243* (2019.01); *G06F 16/2425* (2019.01); *G06F 16/3323* (2019.01)

(58) Field of Classification Search
CPC .... G06F 16/243; G06F 16/2425; G06F 16/20; G06F 16/00; G06F 16/3344; G06F 16/3323
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Carter, "FormYak: Converting forms to coversations" Aug. 28, 2018, ACM.*

(Continued)

*Primary Examiner* — Alexander Khong
(74) *Attorney, Agent, or Firm* — McDonnell Boehnen Hulbert & Berghoff LLP

(57) ABSTRACT

An embodiment may involve persistent storage containing an ordered set of queries that are respectively associated with textual prompts, visibility indicators, definitions of answer formats, and zero or more dependencies on other queries in the ordered set of queries. One or more processors may be configured to iterate through the ordered set of queries, and for a query therein: retrieve the query; determine that the query has a dependency on a previous query; modify a textual prompt of the query, a visibility indicator of the query, or a definition of an answer format of the query; determine that the visibility indicator specifies that the query is visible; provide, by way of a conversational interface, the textual prompt; receive, by way of the conversational interface, an input in response to the textual prompt; verify that the input matches the definition of the answer format; and store the input.

16 Claims, 15 Drawing Sheets

| QUERY | TEXT | MANDATORY? | VISIBLE? | ANSWER FORMAT | DEPENDENCIES |
|---|---|---|---|---|---|
| 1 | "WHO ARE YOU REQUESTING THIS FOR?" | YES | YES | TEXT (DEFAULT: "ALICE SMITH", TABLE: EMPLOYEES) | N/A |
| 2 | "VEHICLE TYPE" | YES | YES | LIST ("PERSONAL", "COMPANY"), (DEFAULT: "PERSONAL") | N/A |
| 3 | "COPY OF DRIVER'S LICENSE" | YES | YES | FILE UPLOAD | N/A |
| 4 | "COPY OF VEHICLE REGISTRATION" | NO | YES | FILE UPLOAD | IF ("VEHICLE TYPE" IS "COMPANY") THEN "VISIBLE" = "NO" |

↖ 700

(51) Int. Cl.
   *G06F 16/332* (2019.01)
   *G06F 16/242* (2019.01)

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B1 | 6/2012 | Sterin |
| 8,321,948 B2 | 11/2012 | Robinson et al. |
| 8,352,908 B2 | 1/2013 | Jhoney et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,369,410 B2 | 6/2016 | Capper et al. |
| 9,912,810 B2 | 3/2018 | Segre et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2011/0137730 A1* | 6/2011 | McCarney ......... G06Q 30/0203 705/14.58 |
| 2014/0259009 A1* | 9/2014 | Bhattiprolu ............... G06F 8/61 717/174 |
| 2017/0177660 A1* | 6/2017 | Chang ................. G06F 16/2425 |
| 2017/0195262 A1* | 7/2017 | Vityaz .................. G06F 40/174 |
| 2017/0371861 A1* | 12/2017 | Barborak ............... G06N 3/006 |
| 2018/0008389 A1 | 3/2018 | Fung et al. |
| 2020/0151206 A1* | 5/2020 | Balakavi ............... G06F 16/338 |
| 2020/0349593 A1* | 11/2020 | Whiting ............. G06F 16/2425 |
| 2020/0363775 A1* | 11/2020 | Bhargava ................. G06F 8/36 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

ServiceNow, Orlando Analytics, Intelligence, and Reporting, Jun. 18, 2020 (downloaded from https://docs.servicenow.com/bundle/orlando-performance-analytics-and-reporting/page/administer/virtual-agent/concept/virtual-agent-overview.html).

* cited by examiner

| QUERY | TEXT | MANDATORY? | VISIBLE? | ANSWER FORMAT | DEPENDENCIES |
|---|---|---|---|---|---|
| 1 | "WHO ARE YOU REQUESTING THIS FOR?" | YES | YES | TEXT (DEFAULT: "ALICE SMITH", TABLE: EMPLOYEES) | N/A |
| 2 | "VEHICLE TYPE" | YES | YES | LIST {"PERSONAL", "COMPANY"}, (DEFAULT: "PERSONAL") | N/A |
| 3 | "COPY OF DRIVER'S LICENSE" | YES | YES | FILE UPLOAD | N/A |
| 4 | "COPY OF VEHICLE REGISTRATION" | NO | YES | FILE UPLOAD | IF ("VEHICLE TYPE" IS "COMPANY") THEN "VISIBLE" = "NO" |

GENERATING CONVERSATIONAL INTERFACES BASED ON METADATA

BACKGROUND

Web-based interfaces are often derived from some form of metadata—information that specifies what components of the interface are displayed in certain locations of the interface. This metadata may be stored in a database and loaded on-demand by one or more scripts that dynamically generate the interface. The interface may then accept various inputs from the user in order to accomplish a goal.

With the rise of conversational interfaces, whether facilitated by text chat or voice, web-based interfaces can be replaced by conversational flows that lead the user step-by-step through inputting data in an organized and logical fashion. But converting a web-based interface into a conversational interface is a manual procedure, as each web-based interface may need to have its components repurposed and ordered in such as fashion to support its own unique conversational flow.

This results in a significant amount of labor required to develop the conversational interface, with the outcomes subjectively relying on the experience of the individuals performing the conversion. As a consequence, different sets of metadata from the same or similar applications may have fundamentally different conversational flows that may be inconsistent with one another as well as inconsistent with the web-based interfaces from which they were derived.

SUMMARY

The embodiments herein overcome these and other drawbacks by dynamically generating conversational flows from metadata that was previously used to generate web-based interfaces. In particular, the metadata specifies an ordered series of queries as well as dependencies between at least some of these queries. The conversational flows may be used in an online chat, such as by way of instant messaging, a virtual agent, or a chat bot. In some embodiments, a voice interface may be provided by a digital voice assistant that uses natural language processing to parse spoken utterances from a user and respond audibly to these utterances in accordance with the conversational flows.

When a user engages with the conversational interface (which some users find more appealing and usable than web-based interfaces), the interface may determine the requested conversational flow, and then proceed through a pre-defined series of queries largely in a given order, gathering and storing input from the user. Queries can be optional or mandatory, in that the user can choose to skip optional queries, but cannot skip mandatory queries. The user may provide answers in various formats, including selection of an option from a menu, text input, uploading a file, and so on.

When a subsequent query depends on the answer provided in response to a previous query, the processing and presentation of the subsequent query is modified accordingly. For example, a previous query may present the user with a list of options. These options may be Boolean (i.e., true or false) or have a number of possible predefined answers. The subsequent query may depend on the answer provided. Based on this answer, the subsequent query could be skipped, made mandatory, made optional, made visible, made not visible, or have its possible answers change. In some cases, a subsequent query could depend on answers provided to two or more previous queries.

This enables the conversational interface to provide a rich and flexible dialog tree functionality. Furthermore, it does so without having to manually configure such dialog trees. Instead, these conversational flows can be generated on-demand by parsing the queries in order. This allows a web-based application with a significant number of pages that prompt for and receive multiple user inputs to be converted to having respective conversational interfaces without having to spend hundreds or thousands of hours to do so. Further, conversions using these interfaces occur based on application of rules rather than on a subjective basis. In this fashion, conversational interfaces can be generated automatically and easily modified by editing the metadata from which they are derived.

Accordingly, a first example embodiment may involve persistent storage containing an ordered set of queries, wherein the queries are respectively associated with textual prompts, visibility indicators, definitions of answer formats, and zero or more dependencies on other queries in the ordered set of queries. The first example embodiment may also involve one or more processors configured to iterate through the ordered set of queries, and for a particular query therein: retrieve, from the persistent storage, the particular query; determine that the particular query has a particular dependency on a previous query; based on a previous answer provided for the previous query, modify a textual prompt of the particular query, a visibility indicator of the particular query, or a definition of an answer format of the particular query; determine that the visibility indicator specifies that the particular query is visible; provide, by way of a conversational interface, the textual prompt; receive, by way of the conversational interface, an input in response to the textual prompt; verify that the input matches the definition of the answer format; and store, in the persistent storage, the input.

A second example embodiment may involve retrieving, from persistent storage, a particular query in an ordered set of queries, wherein the queries are respectively associated with textual prompts, visibility indicators, definitions of answer formats, and zero or more dependencies on other queries in the ordered set of queries. The second example embodiment may involve determining that the particular query has a particular dependency on a previous query. The second example embodiment may involve, possibly based on a previous answer provided for the previous query, modifying a textual prompt of the particular query, a visibility indicator of the particular query, or a definition of an answer format of the particular query. The second example embodiment may involve determining that the visibility indicator specifies that the particular query is visible. The second example embodiment may involve providing, by way of a conversational interface, the textual prompt. The second example embodiment may involve receiving, by way of the conversational interface, an input in response to the textual prompt. The second example embodiment may involve verifying that the input matches the definition of the answer format. The second example embodiment may involve storing, in the persistent storage, the input.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts metadata that can be used to generate a web-based or conversational interface, in accordance with example embodiments.

DETAILED DESCRIPTION

Figure 1:
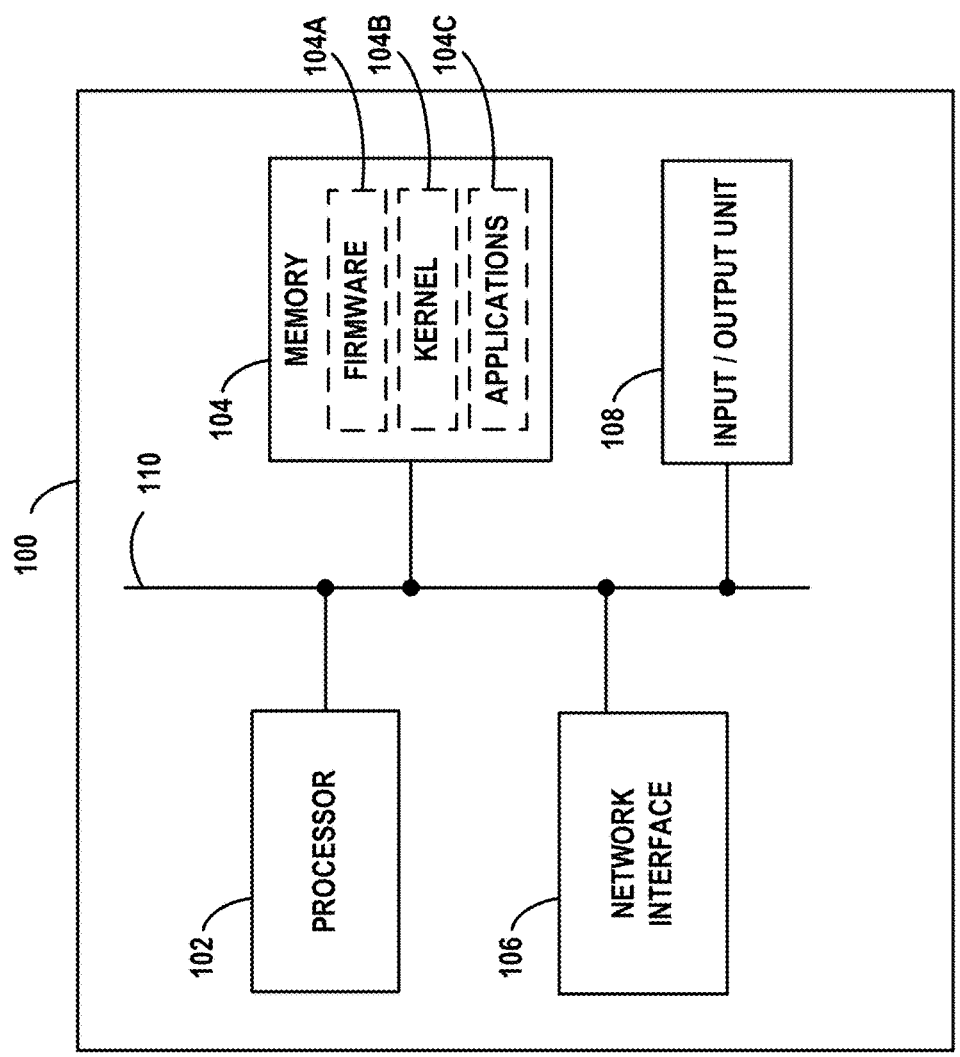
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
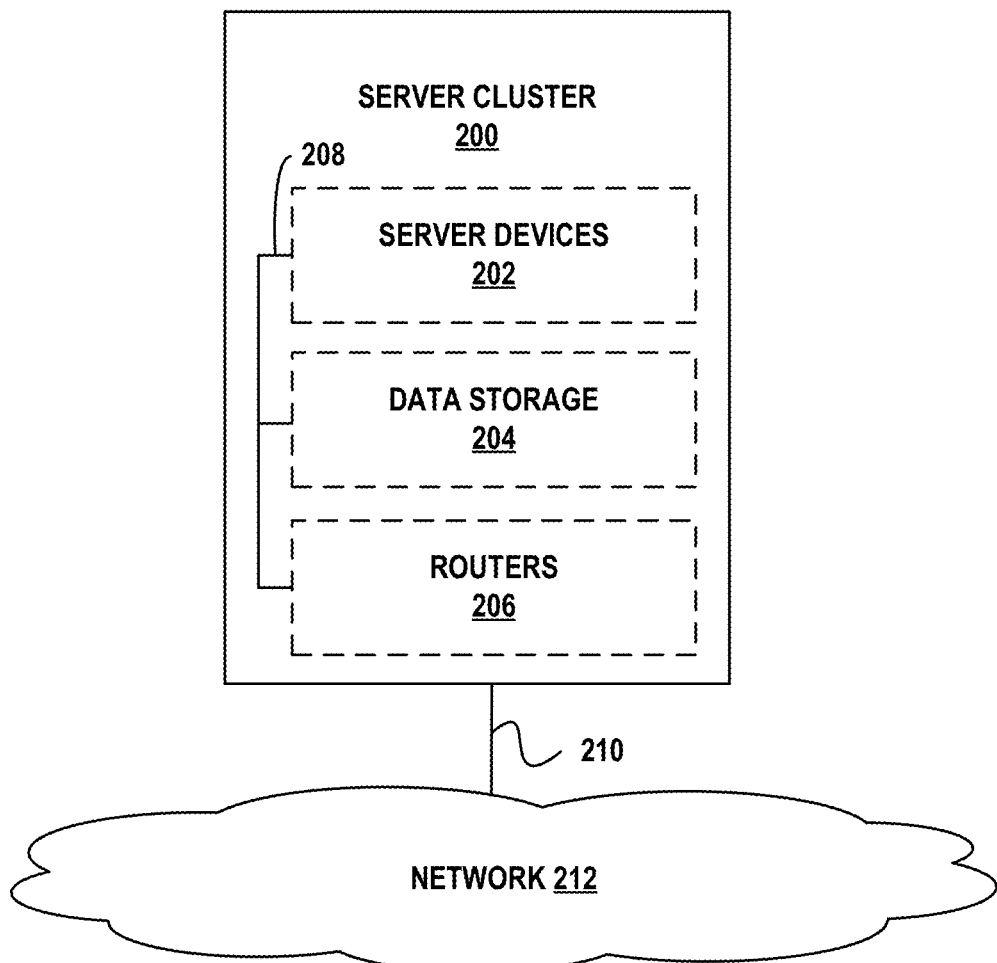
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
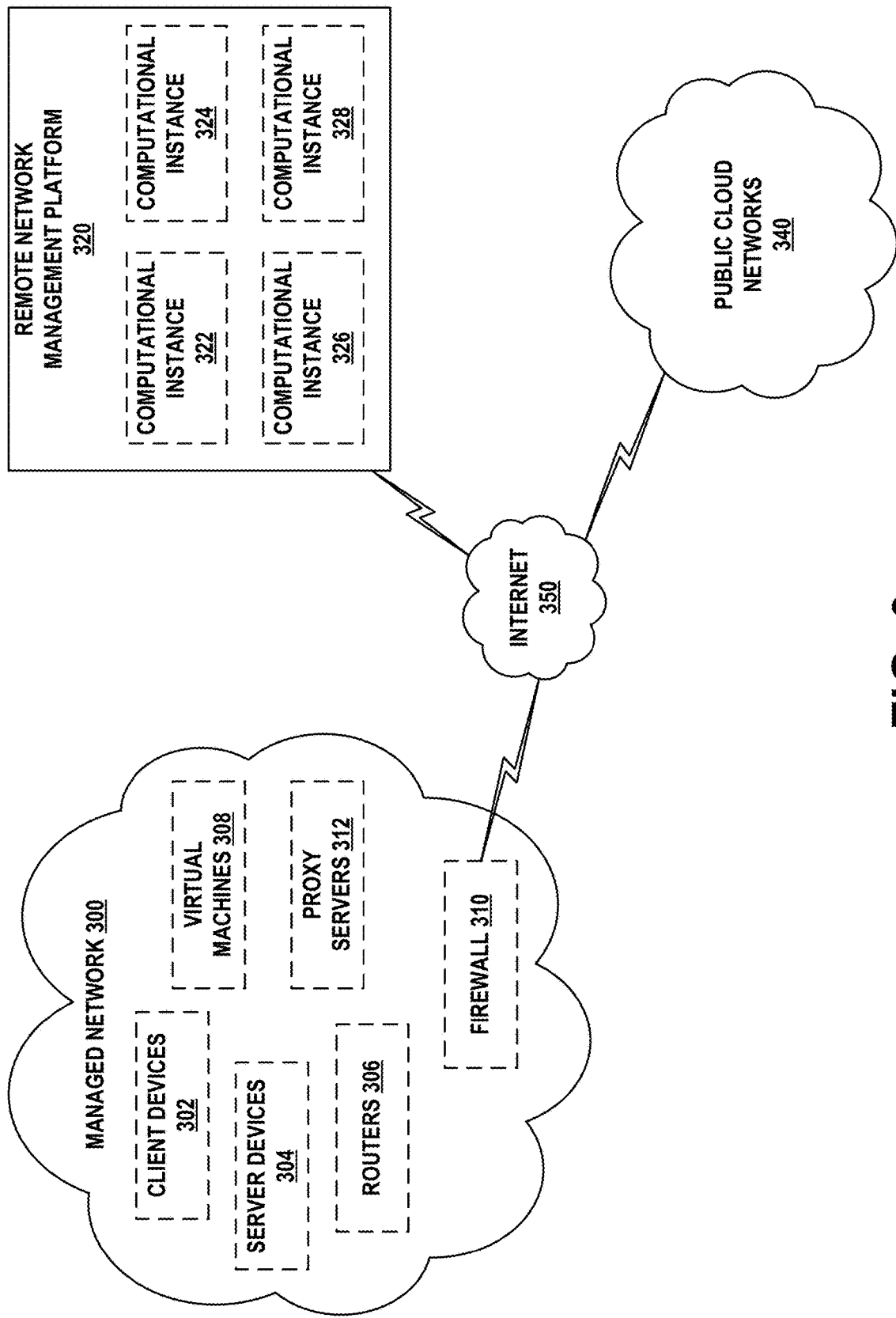
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
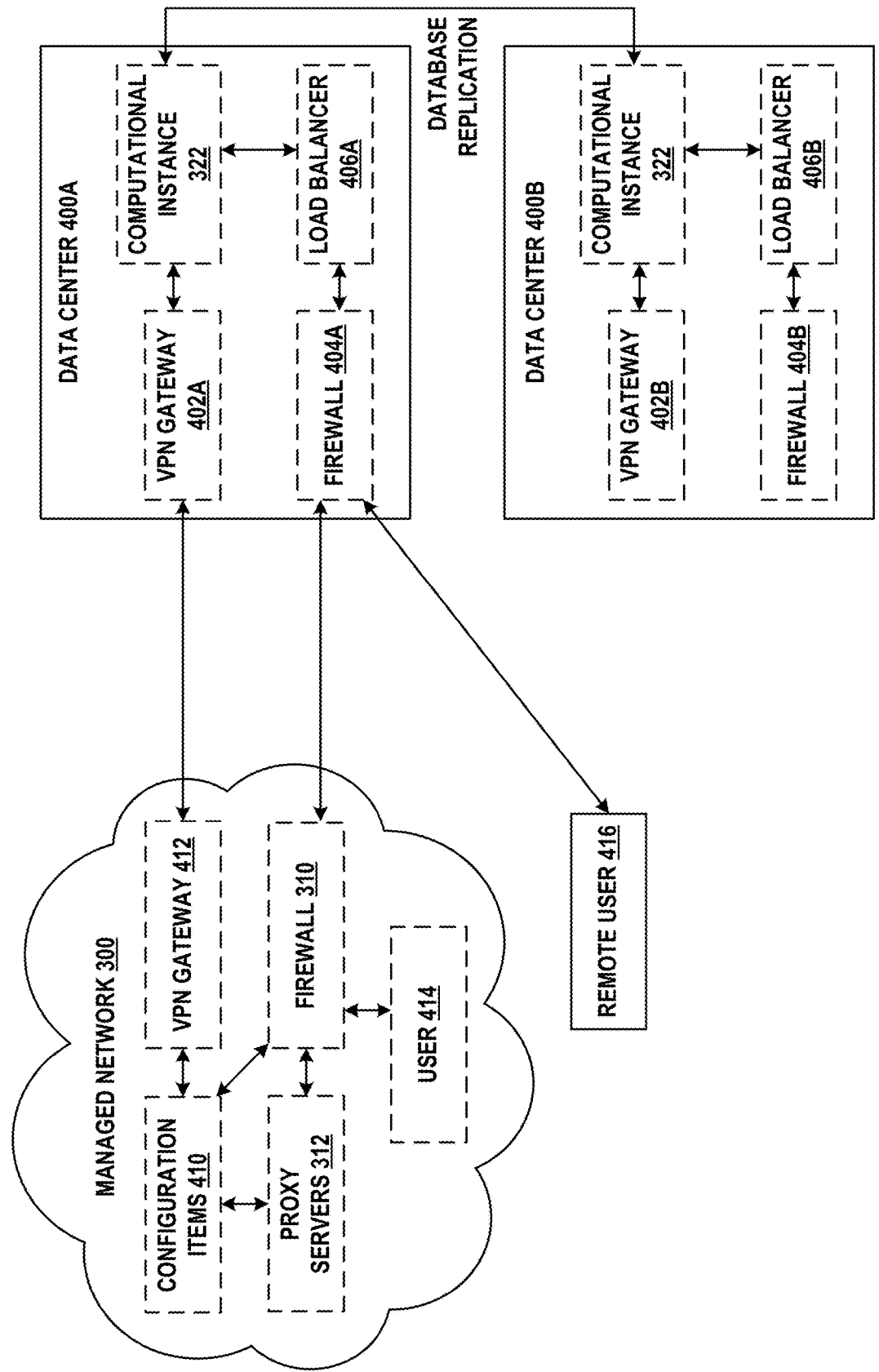
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
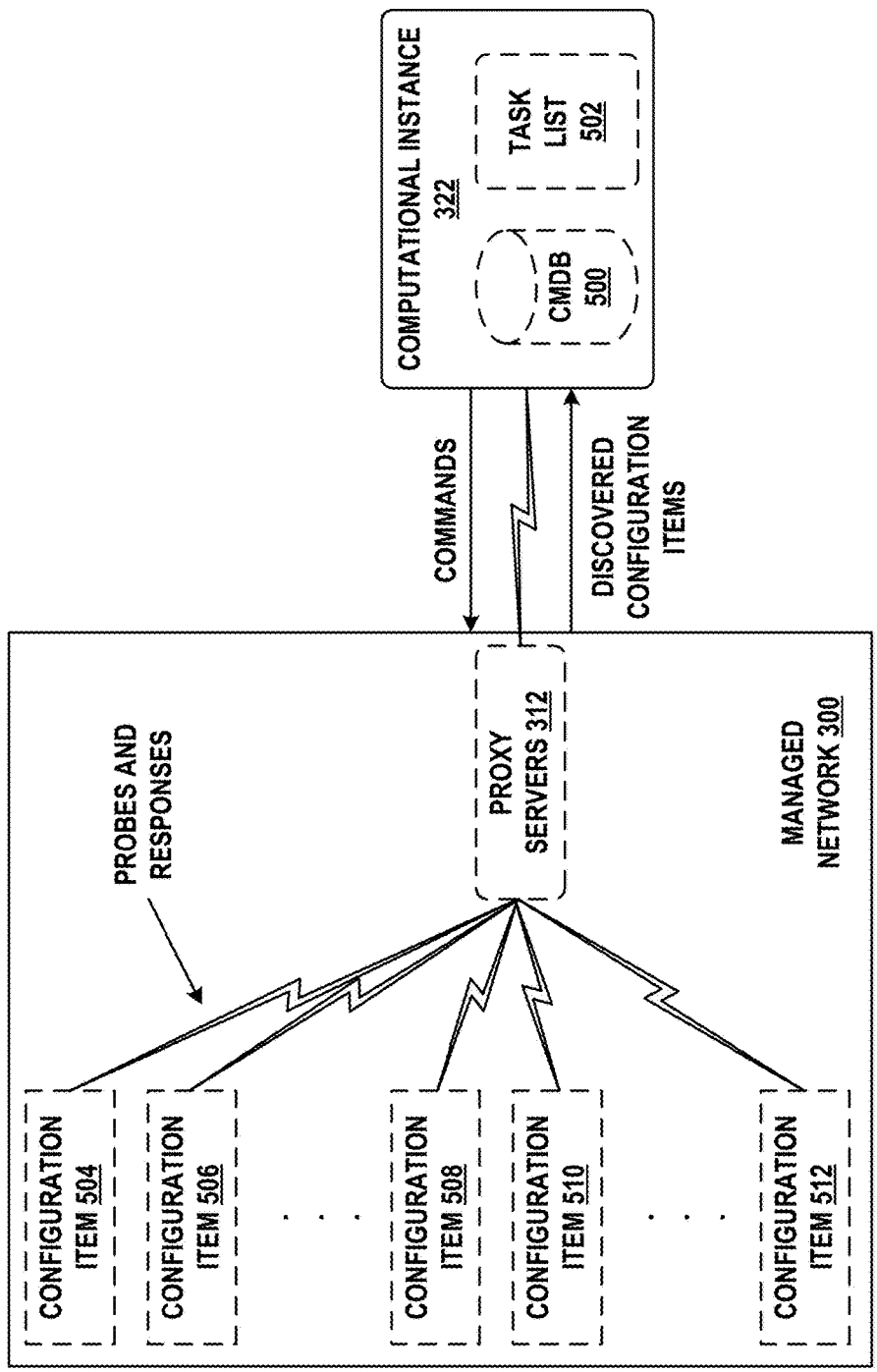
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly queries task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
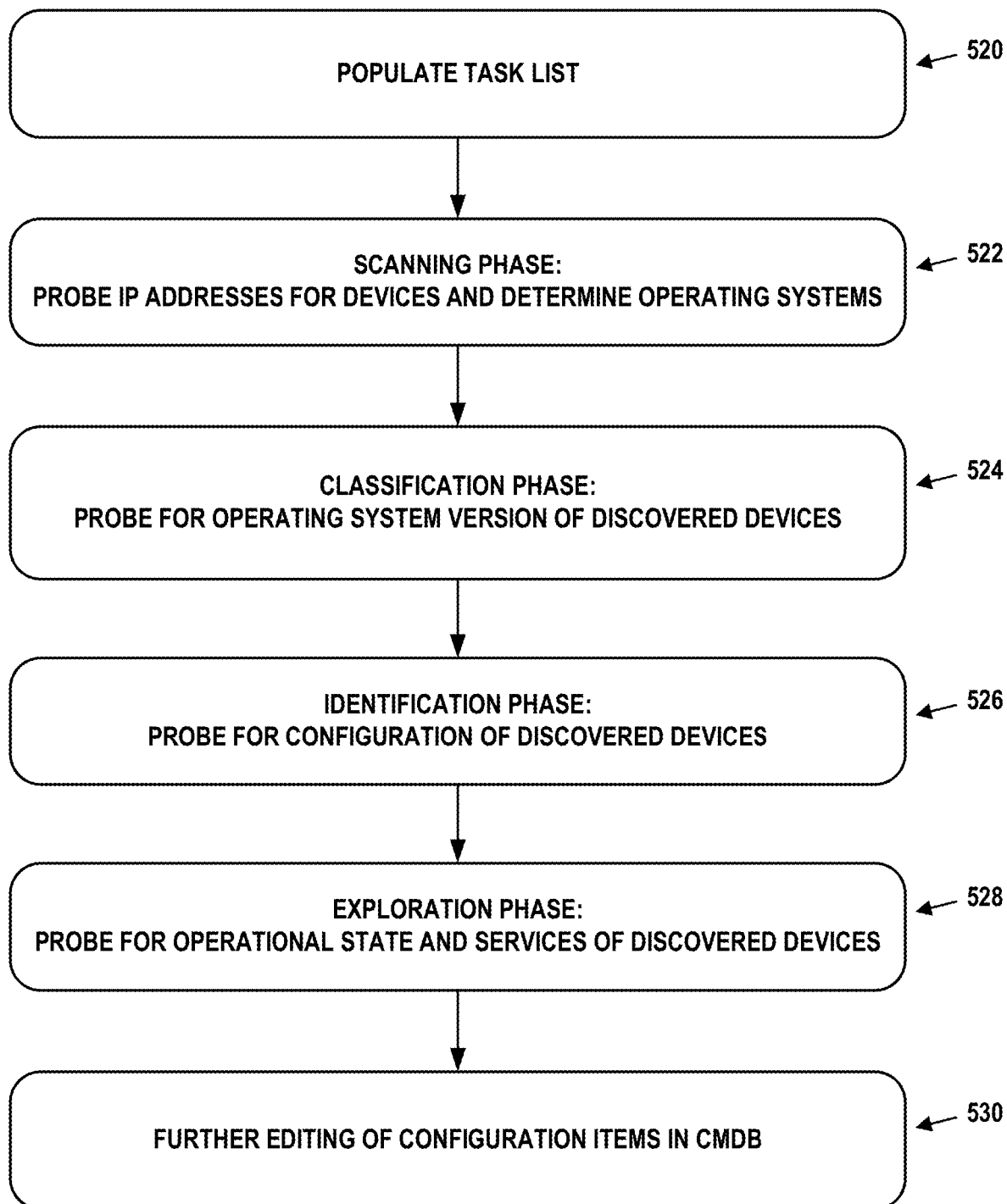
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE WEB-BASED INTERFACE AND SUPPORTING METADATA

Figure 6A:
FIGS. 6A and 6B depict a web-based interface, in accordance with example embodiments.

FIG. 6A depicts example web-based interface 600. While the content of such an example interface could vary, web-based interface 600 is related to an application that allows an employee of an enterprise to order a parking sticker. This application may execute on a computational instance of a remote network management platform. Further, this application may be a data-driven application, in that its layout, displayed content, and input options may be defined by entries in at least one database table.

Web-based interface 600 contains two panes. Pane 602 includes description 606 of the ordering process (along with an image of a parking sticker), and input elements 608, 610, 612, and 614.

Input element 608 is a text box in which the user can enter free-form text specifying a person for whom the parking sticker is being requested. In some cases, the text entered may be checked against a list of known options (from an employee database for example) in order to ensure that the text is valid.

Input element 610 is a drop-down menu in which the user can select whether the vehicle for which the parking sticker is being requested is a personal vehicle or a company vehicle. Other vehicle type options may be possible.

Input element 612, when actuated, may cause a popup window to appear (not shown) allowing the user to upload a file. This popup window may allow the user to browse a local file system, for example, for a file containing a copy of the requested driver's license.

Input element 614, when actuated, may also cause a popup window to appear (not shown) allowing the user to upload a file. This popup window may also allow the user to browse the local file system, this time for a file containing a copy of the requested vehicle registration.

Notably, there is an asterisk to the left of the textual descriptions of input elements 608, 610, and 612, indicating that these input elements are mandatory. Thus, the parking sticker request may not be able to be submitted without values being entered for each of these input elements. There is no such asterisk associated with input element 614, indicating that this input element is optional. Therefore, the parking sticker request may be able to be submitted without a value being entered for this input element.

Pane 604 contains submit button 616 with which a parking sticker request can be submitted with the values specified for input elements 608, 610, and 612, as well as 614 when present. As noted, submit button 616 might not be actuatable until answers are provided to all mandatory questions.

In some cases, the characteristics of one input element can depend on what is entered for another input element. In general, a dependency may be expressed as one or more Boolean conditions involving the answer provided to a previous query or the answers provided to multiple previous queries. For example, when "Personal" is selected as the vehicle type in input element 610, input element 614 may be displayed. However, when "Company" is selected for input element 610, input element 614 may be omitted.

Figure 6B:

This is shown in FIG. 6B. Therein, web-based interface 600 is largely the same as FIG. 6A, except that "Company" is selected for input element 610, input element 614 is omitted from web-based interface 600. In other situations, input element 614 could be modified from optional to mandatory, mandatory to optional, or have its type of input changed. This ability to have the characteristics of one query depend on the input provided for another allows complex series of inquiries to be formed.

While an application that facilitates requests for parking stickers is shown for purposes of example, the embodiments herein are not limited to such an application. Instead, these embodiments can be used with any data-driven web-based application with an established ordering of inputs and possible dependencies between these inputs. The application shown may also support the user requesting other items, such as laptops, cell phones, etc.

Web-based interface 600 may be derived at least in part from metadata. This metadata may be specified, organized, and stored in various ways. As noted above, it is assumed that the metadata discussed herein is stored in a database (e.g., a database of a computational instance, such as a CMDB). But other options are possible.

FIG. 7 depicts database table 700, which contains metadata that can be used to generate web-based interface 600. Table 700 is an ordered set of queries, each with a number of fields. For a given query, these fields include the text of the query, an indication of whether answering the query is mandatory, an indication of whether the query is visible, the format of the answer (including pre-determined possible answers in some cases), and an optional specification of dependencies. Not shown for sake of simplicity is any introductory text (e.g., description 606), graphics associated with the introductory text, graphics associated with individual queries, or intermediate or interstitial text that assists in transitions before or after queries. This information may reside in the same or other database tables, for example.

The application providing web interface 600 (e.g., an application configured to execute on a computational instance) may parse each of the queries and any related information in order to generate this interface. For example, the application may first generate HTML and/or script logic representing description 606 with its accompanying text embedded therein.

Then the application may parse query 1. This may involve identifying its text, noting that this query is mandatory and visible, determining its answer format, and also determining that it has no dependencies. Since query 1 is visible, the application may generate HTML and/or script logic such that the text and its input mechanisms will be displayed, along with an indication that it is mandatory (see input element 608).

The answer format of query 1 is given as "Text (default: "Alice Smith", table employees)". This can be interpreted as the answer format being a free-form text box with a default value of "Alice Smith", where any input entered into this text box is checked against the database table titled "employees" for correctness. The value "Alice Smith" might or might not be in this table—in the latter case it serves as a placeholder value. In some cases, the fields (columns) of the "employees" table in which names can be found may also be specified in the answer format.

Thus, the application may generate HTML and/or script logic for input element 608 being such a text box with "Alice Smith" as default input. The script logic may be configured such that the entered text is checked against the "employees" table. When the entered text matches an entry in this table, the text may be autocompleted to represent that entry. When the entered text does not fully match an entry this table, the application may suggest one or more selectable options based on a partial match search of the table. Thus, for example, if the user enters "Bob Jons" and there is no match of this text string in the "employees" table, but there are entries in the this table for "Bob Jones" and "Bob Johns", the HTML and/or script logic for input element 608 may provide these two valid inputs as selectable options in a menu.

The application may then parse query 2. This may involve identifying its text, noting that the query is mandatory and visible, determining its answer format, and also determining that it has no dependencies. Since query 2 is visible, the application may generate HTML and/or script logic such that the text and its input mechanisms will be displayed, along with an indication that it is mandatory (see input element 610).

The answer format of query 2 is given as "List {"Personal", "Company"}, default: "Personal"). This can be interpreted as the answer format being a menu with pre-defined options ("Personal" and "Company"), with a default value of "Personal". Thus, the application may generate HTML and/or script logic for input element 610 being a drop-down menu with the selectable options "Personal" and "Company", where "Personal" is initially selected but is changeable by the user.

The application may then parse query 3. This may involve identifying its text, noting that the query is mandatory and visible, determining its answer format, and also determining that it has no dependencies. Since query 3 is visible, the application may generate HTML and/or script logic such that the text and its input mechanisms will be displayed, along with an indication that it is mandatory (see input element 612).

The answer format of query 3 is given as file upload. Therefore, the application may generate HTML and/or script logic for input element 612 to display an "upload" button that is actuatable to allow a user to specify a file stored on the user's device (e.g., by way of a popup window).

The application may then parse query 4. This may involve identifying its text, noting that the query is not mandatory but is visible, determining its answer format, and also determining that it has dependencies. Since query 4 is visible, the application may generate HTML and/or script logic such that the text and its input mechanisms will be displayed, but with no indication that it is mandatory (see input element 614).

The answer format of query 4 is given as file upload. Therefore, the application may generate HTML and/or script logic for input element 614 to display another "upload"

button that is actuatable to allow a user to specify a file stored on the user's device (e.g., by way of a popup window).

The dependencies of query 4 indicate that the visibility of this query depends on the input provided for query 2. Thus, while query 4 is visible by default, if the user selects "Company" as input for query 2, query 4 is changed to not be visible. This allows the behavior shown in FIGS. 6A and 6B, where input element 614 is present when the answer for input element 610 is "Personal" but not present when the answer for input element 610 is "Company". Thus, if the user switches between these two answers, the HTML and/or script logic might display or not display input element 614 accordingly.

While FIG. 7 shows only four queries, more or fewer queries may be present. Further, the dependencies between queries may be more complicated. For example, a subsequent query may depend on the answers provided to two or more previous queries. Additionally, dependencies can also be used to change the text, mandatory or optional nature, or answer format of a subsequent query. In this way, arbitrarily complicated dialog trees can be generated.

The application may also generate HTML and/or script logic for pane 604. Notably, the script logic may prevent submit button 616 from being actuated until all mandatory queries have answers.

The script logic generated by the application may execute on the user's client device, e.g., in a web browser. Thus, the script logic may use JAVASCRIPT® or a similar language. Further, the script logic may retrieve queries from a database of the computational instance, collect answers to the queries, enforce dependencies, and write the results thereof to the database. For example, in the interaction shown in FIG. 6B, the name "Alice Smith" entered for input element 608, the vehicle type of "Company" entered for input element 610, and the specified file uploaded for input element 612 may be transmitted to the database in response to actuation of submit button 616.

VI. EXAMPLE CONVERSATIONAL INTERFACE BASED ON METADATA

As noted above, there are a number of advantages that a conversational interface may have over a web-based interface. Some users find conversational interfaces to be more natural, in that they mimic familiar human dialog. These users might also find web-based interfaces to be confusing and overwhelming due to the amount of information presented all at once. Thus, it can be advantageous to develop conversational interfaces for applications, such as the parking sticker ordering application of FIGS. 6A and 6B.

But caution should be exhibited in doing so. This application may be a generic catalog ordering application with hundreds or thousands of items that are changing and/or going in and out of stock frequently. Developing conversational interfaces for each of these items is a monumental task, requiring thousands of hours of effort. And due to the aforementioned dynamic nature of the catalog, these interfaces are likely to be out of date once they are complete. Further, having each conversational interface designed manually may result in a different conversational style and/or look and feel for different sets of items. This may be due to the inherently subjective and varying nature of user interface design.

Rather than suffer from these deficiencies, conversational interfaces may be generated from the same metadata that is already used for generating web-based interfaces. From this metadata, as well as some additional logic and processing, web-based interface 600 can be converted into a dialog tree. This dialog tree can be executed by way of an instant messenger, messaging application, social networking application, chat bot, virtual agent, web-based chat interface, or some other mechanism.

For purposes of example, FIGS. 8A-8D depict conversational interface 800 displaying a dialog between an automated chat bot and a user. This dialog includes a series of messages that provide roughly equivalent functionality as that of web-based interface 600. In these figures, messages generated by the conversational interface are shown as emanating from the left, while messages entered by the user are shown as emanating from the right.

Messages 802, 804, 806, and 808 are introductory and not specific to the application that allows ordering of a parking sticker. These messages orient the user and allow the user to specify that he or she wishes to submit a request for a parking sticker.

Message 810 and most of the chat bot messages that follow may be generated from metadata associated with table 700 or related tables. For instance, message 810 contains the introductory text and its associated graphics for the dialog (e.g., similar to description 606 and its accompanying image). Message 812 asks the user whether he or she wants to proceed with the request.

Figure 8A:
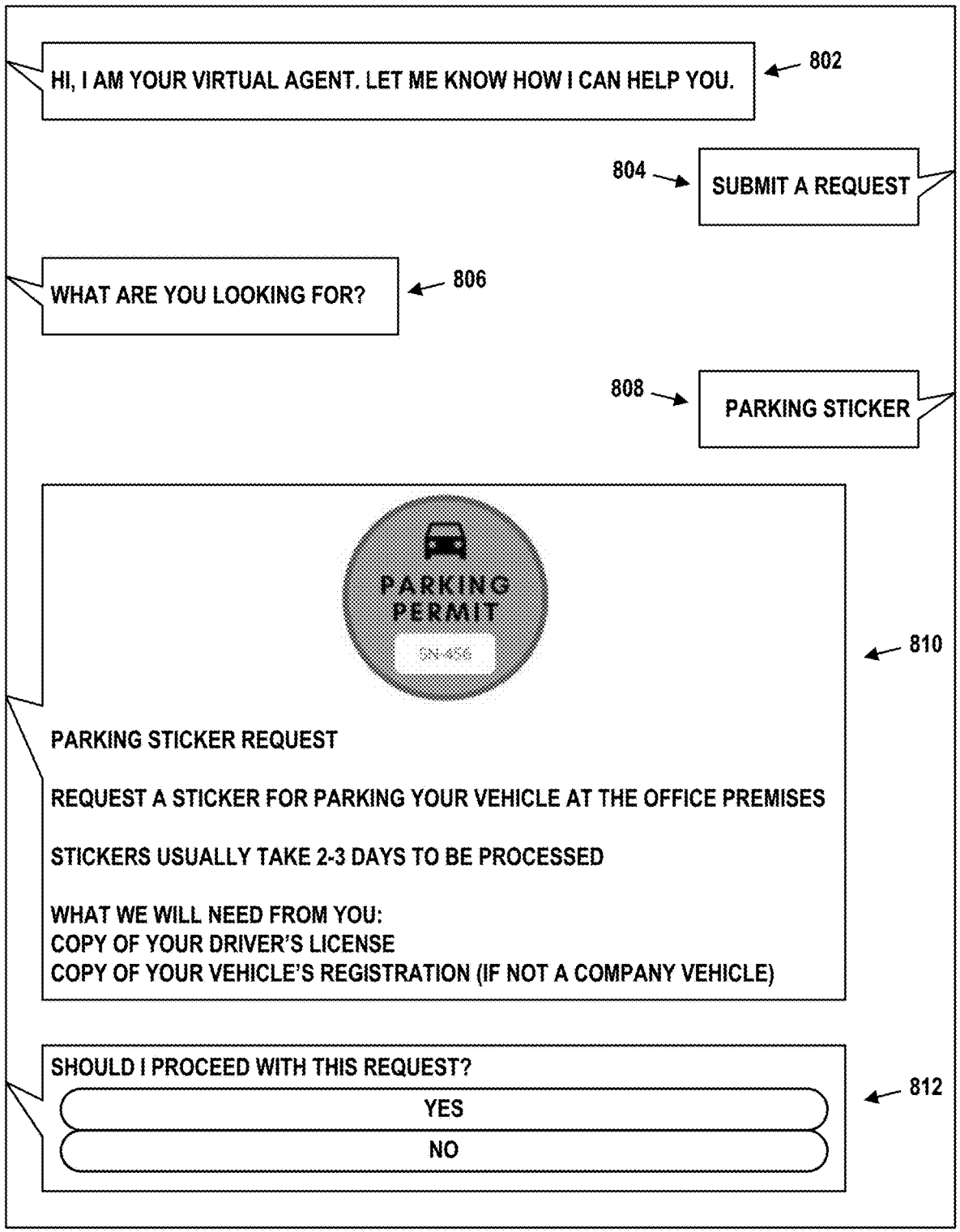
FIGS. 8A, 8B, 8C, and 8D depict conversational interfaces, in accordance with example embodiments.
Figure 8B:
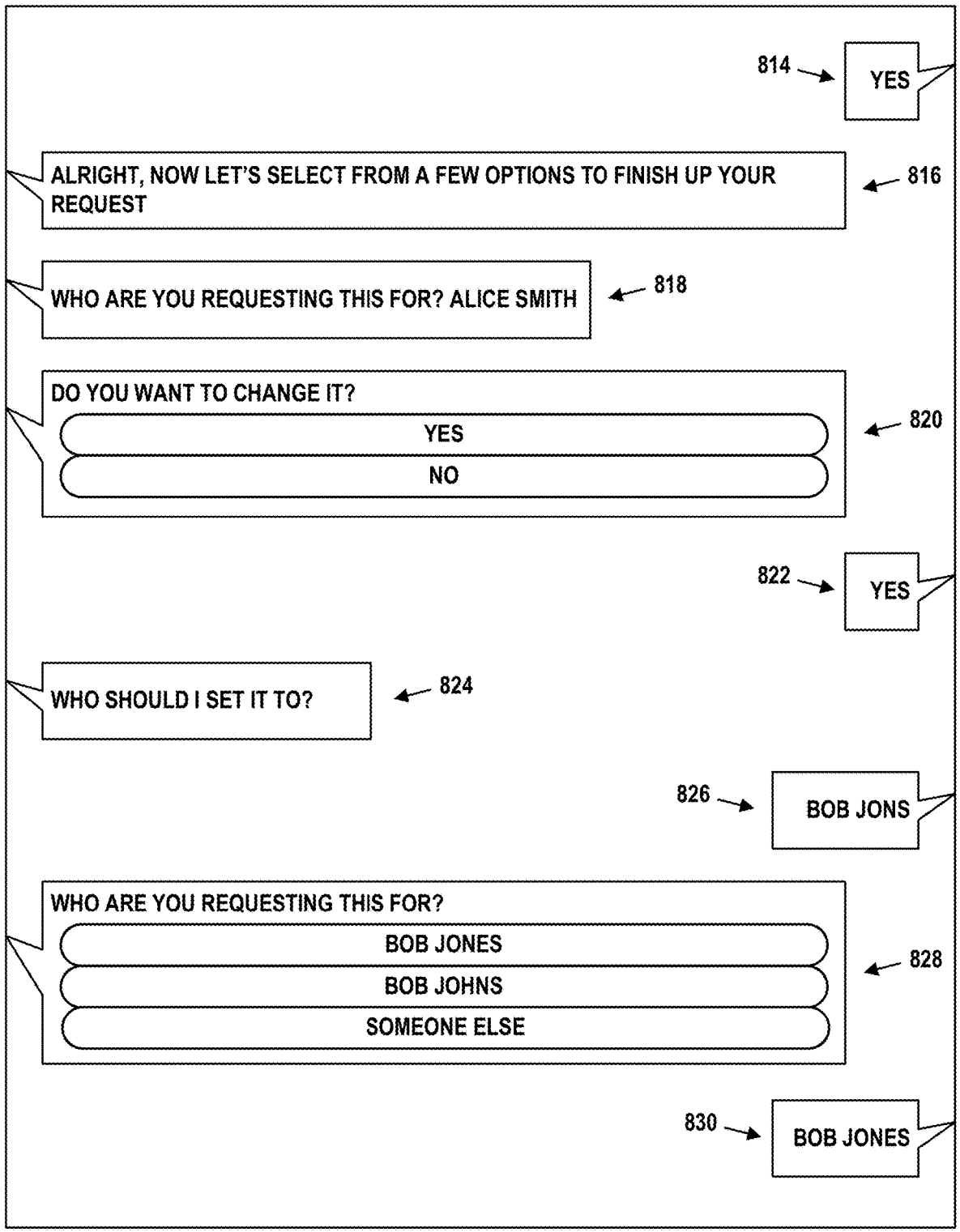

Turning to FIG. 8B, message 814 indicates that the user selected the "yes" option. In particular, the user may have actuated the "yes" option from the menu in message 812, and this selection is shown in message 814. Message 816 is intermediate text that is not specifically provided by the metadata but may be inserted in a similar location of some or all generated conversation flows.

Messages 818, 820, 824, and 828 are based on query 1 of table 700. The text from this query is shown in message 818 along with the default value of the answer. Since the default value is free-form text, message 820 allows the user to indicate that he or she wishes to change this value. Message 822 shows that the user selected the "Yes" option from message 820.

Message 824 prompts the user for free-form text input. In message 826, the user provides this input as "Bob Jons". As indicated by the entry for query 1 in table 700, the user's input is searched in the "employees" table. Finding that it does not exist, message 828 prompts the user to select one of two options that were found based on a partial match ("Bob Jones" and "Bob Johns") or someone else. If the user selects the latter option, the dialog may loop back to message 824. Regardless, message 830 indicates that the user selected "Bob Jones" from message 828. If the user selects "Someone Else", message 824 may be repeated.

Figure 8C:
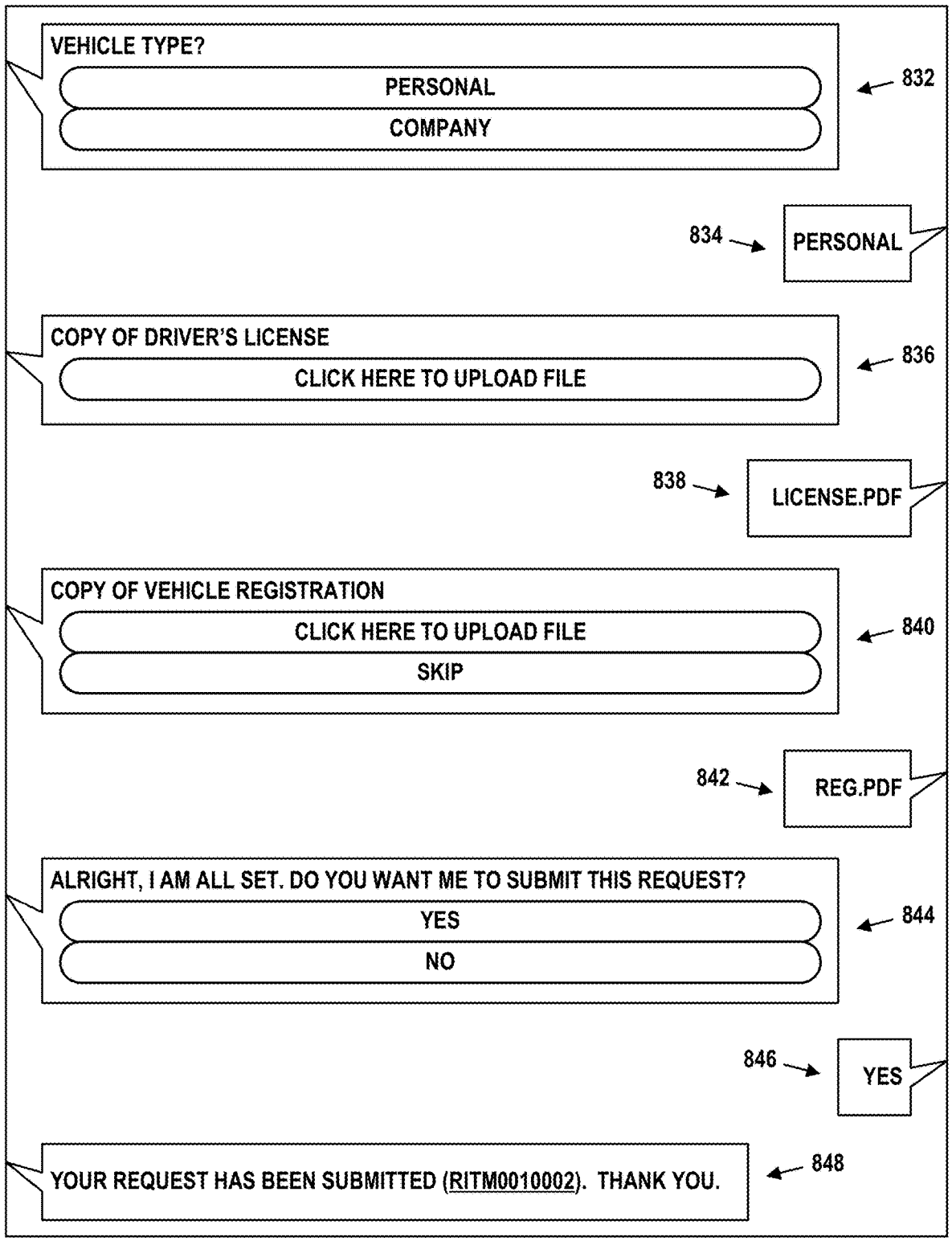

Turning to FIG. 8C, message 832 is based on query 2 and prompts the user to select either "Personal" or "Company". This prompt is generated based on the answer format for query 2 being a list with these two possible values. Message 834 shows that the user selected the "Personal" option from message 832.

Message 836 is based on query 3 and prompts the user to upload a file. This prompt is generated based on the answer format for query 3 being a file upload. Message 838 shows that the user has uploaded the file "license.pdf". Display of a popup window in which the user can select the file from his or her local file system is omitted.

Message 840 is based on query 4 and prompts the user to upload a file or skip such an upload. This prompt is generated based on the answer format for query 4 being a file upload and that providing an answer to this query is not mandatory. Message 842 shows that the user has chosen to upload a file and that file is named "reg.pdf".

Message 844 is intermediate text that is not specifically provided by the metadata but may be inserted in a similar location of some or all generated conversation flows. Particularly, message 844 confirms that the user wishes to submit the request with the answers provided. Message 846 shows that the user selected the "Yes" option from message 844.

Message 848 is also intermediate text that is not specifically provided by the metadata but may be inserted in a similar location of some or all generated conversation flows. This message confirms that the request has been submitted and also provides a reference number for the request (RITM0010002). This reference number is underlined in FIG. 8C to indicate that it may be a hyperlink to a web-based interface for displaying details of the request. This ends the dialog.

Figure 8D:
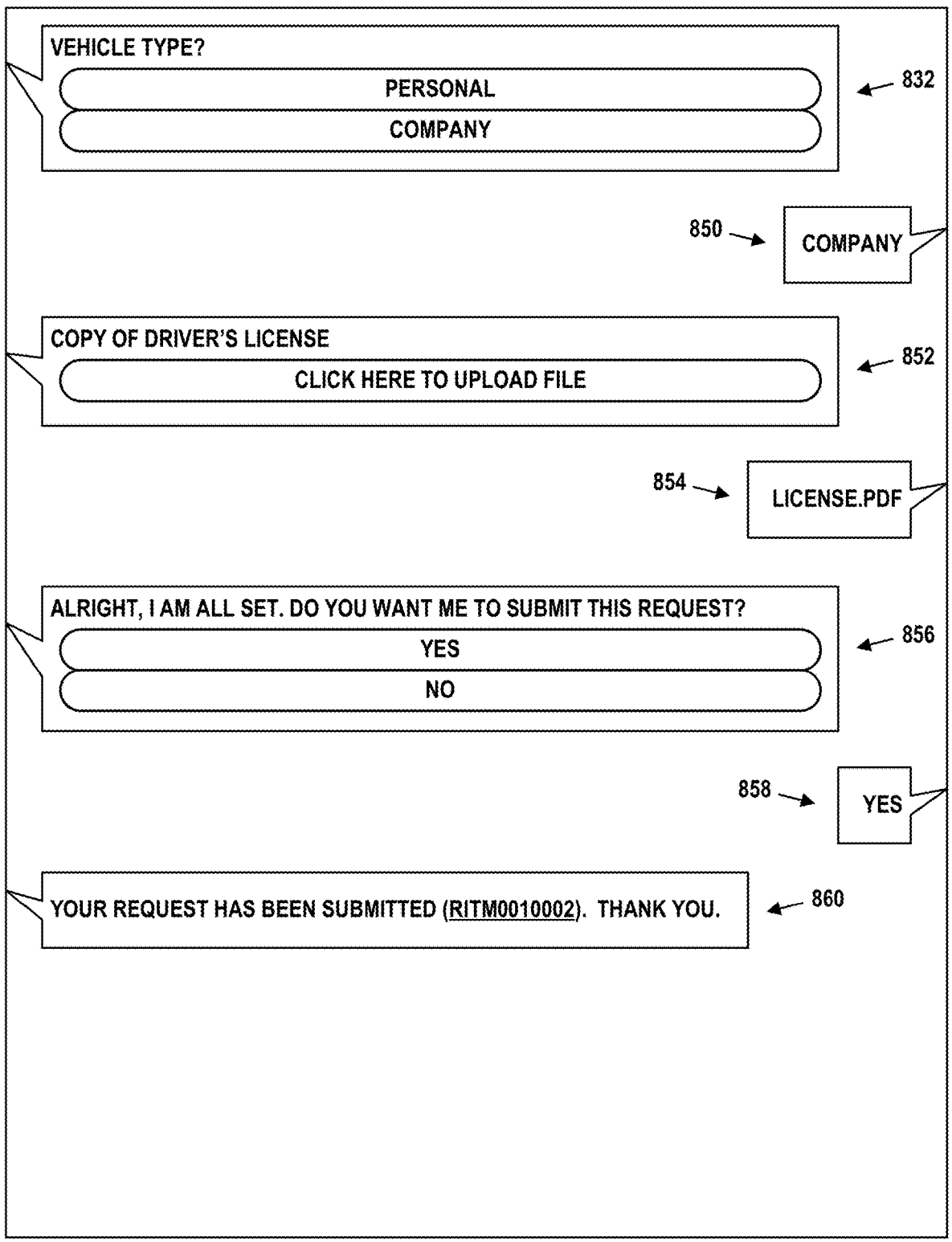

FIG. 8D depicts an alternative sequence of events from FIG. 8C. Notably, as shown in message 850, the user selects the "Company" option from message 832. Thus, the dialog from the combination of FIGS. 8A, 8B, and 8C is different than the dialog from the combination of FIGS. 8A, 8B, and 8D.

Message 852 is based on query 3 and prompts the user to upload a file. This prompt is generated based on the answer format for query 3 being a file upload. Message 854 shows that the user has uploaded the file "license.pdf". Display of a popup window in which the user can select the file from his or her local file system is omitted.

Query 4 is not displayed in FIG. 8D. This is because, as shown in table 700, query 4 has a dependency on the answer provided to query 2. Since query 2 was answered with "Company", the visibility of query 4 is turned off. Therefore it is omitted from the dialog.

Message 856 is intermediate text that is not specifically provided by the metadata but may be inserted in a similar location of some or all generated conversation flows. Particularly, message 856 confirms that the user wishes to submit the request with the answers provided. Message 858 shows that the user selected the "Yes" option from message 856.

Message 860 is also intermediate text that is not specifically provided by the metadata but may be inserted in a similar location of some or all generated conversation flows. This message confirms that the request has been submitted and also provides a reference number for the request (RITM0010002). This reference number is underlined in FIG. 8D to indicate that it may be a hyperlink to a web-based interface for displaying details of the request. This ends the dialog.

Figure 9:
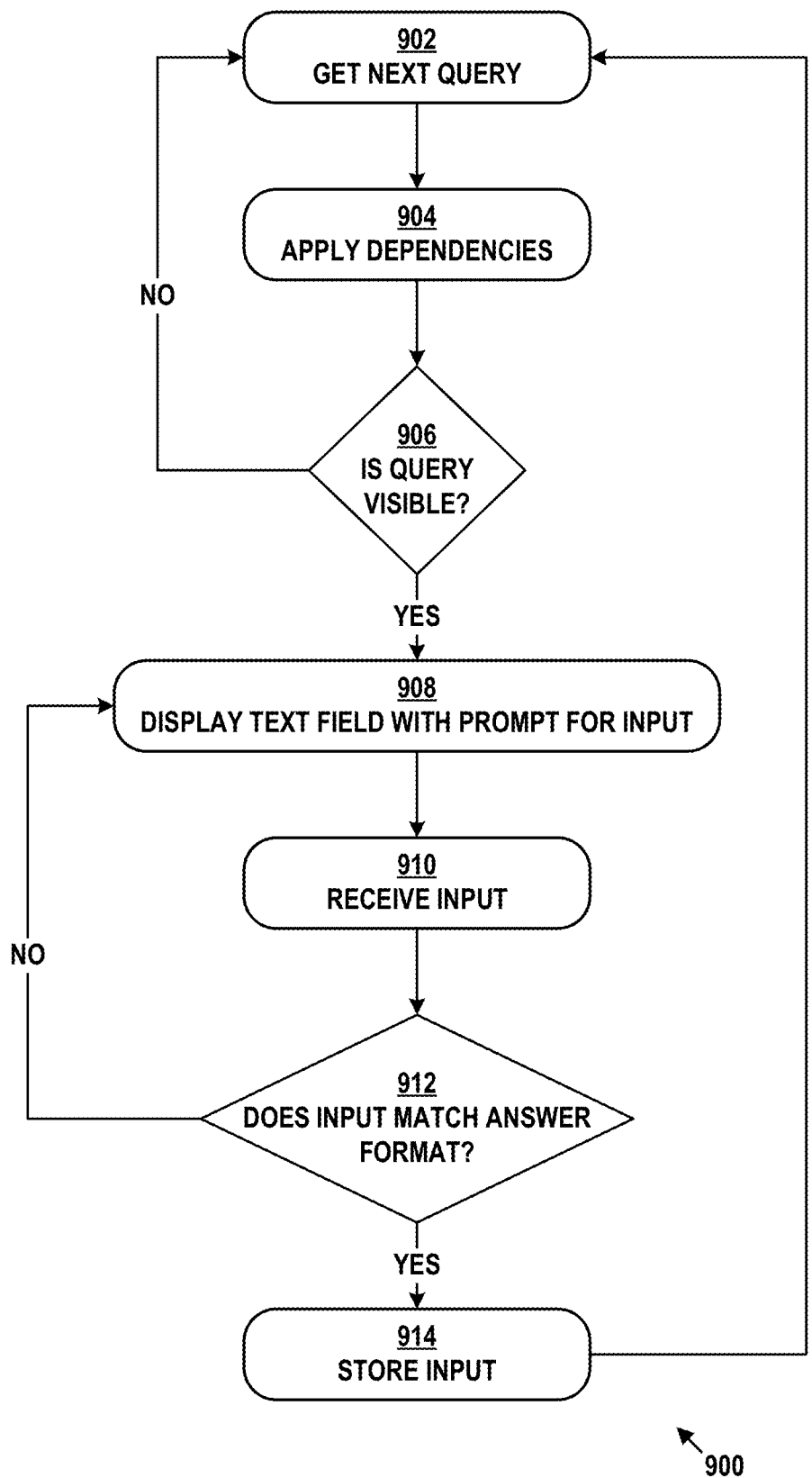
FIG. 9 is a flow chart, in accordance with example embodiments.

FIG. 9 is a flow chart 900 of a process that can be applied to provide the conversational interface of FIGS. 8A, 8B, 8C, and 8D. In other words, a computational instance of a remote network management platform may access data representing an ordered set of queries (e.g., as entries in table 700), and iterate through these queries in order. For each query, its associated text may be displayed and an answer may be received. When a query has a dependency, the dependency may be applied to possibly modify the text, the answer format, the visibility, and/or whether the query is mandatory. Though not shown in FIG. 9, various units of intermediate text that are not specified in the entries of table 700 may be inserted in the conversation between the blocks of flow chart 900 in order to enhance the conversational interface.

At block 902, the next query is retrieved. This may involve reading an entry from a database table (e.g., table 700) that contains this query. At block 904, any dependencies of the query on answers provided to previous queries may be applied. As noted, these dependencies may involve making modifications to any field or fields of the query. An example dependency is shown for query 4 of table 700 and is discussed in more detail above.

At block 906, it is determined whether the query is visible. This may involve checking the visibility field of the query and/or the dependencies of the query to determine whether these dependencies change the visibility of the query. If the query is not visible, the query is not displayed and control returns to block 902 where the next query (if any) is retrieved. If the query is visible, control progresses to block 908.

At block 908, the content of the text field of is displayed in the conversational interface, along with a prompt for input. The prompt may include a menu with selectable options, for example. If the query is not mandatory, one of these options may be to skip answering the query. As noted, the conversational interface could be provided by way of an instant messenger, messaging application, social networking application, chat bot, virtual agent, or web-based chat interface.

At block 910, input from the user is received. This serves as the answer to the query. In some cases, the user may actuate a pre-determined answer from a menu, or enter free-form text as the answer.

At block 912, it is determined whether the input provided as the answer matches the answer format. For instance, if the user entered free-form text as an answer and the query specifies that this text should be checked against a database table for accuracy, such a check may be made. If the input does not match the answer format, control may return to block 908, where the text field is again displayed in the conversational interface, along with another prompt for input. In some cases, this further prompt may be based on the provided answer being autocompleted to the closest match or matches from a pre-determined list or database table, and a menu of possible options being displayed (see messages 826, 828, and 830 of FIG. 8B for an example). If the input does match the answer format, control progresses to block 914.

At block 914, the input (answer) is stored. This may involve writing the input to persistent storage, such as a table of a database. If the query was skipped due to it not being mandatory, an indication that the query was skipped may be written to the persistent storage.

After block 914, control returns to block 902 where the next query (if any) is retrieved. This iterative (looping) process continues until all queries have been processed.

These embodiments may require that dependencies between queries can only occur such that queries later in the ordering are dependent on queries earlier in the ordering (reverse dependencies). This is due to the comparatively linear nature of queries provided by way of a conversational interface. In contrast, a web-based interface may support queries earlier in the order having dependencies on queries later in the order (forward dependencies) because the web-based interface can simultaneously display prompts for input to multiple queries. Despite this potential restriction on conversational interfaces, these interfaces retain the aforementioned advantages over web-based interfaces in terms of user experience.

In any event, the computational instance might check a set of queries for forward dependencies before initiating a conversational interface for these queries. If forward dependencies are found, the computational instance may revert to using a web-based interface instead of a conversational instance.

VII. EXAMPLE OPERATIONS

Figure 10:
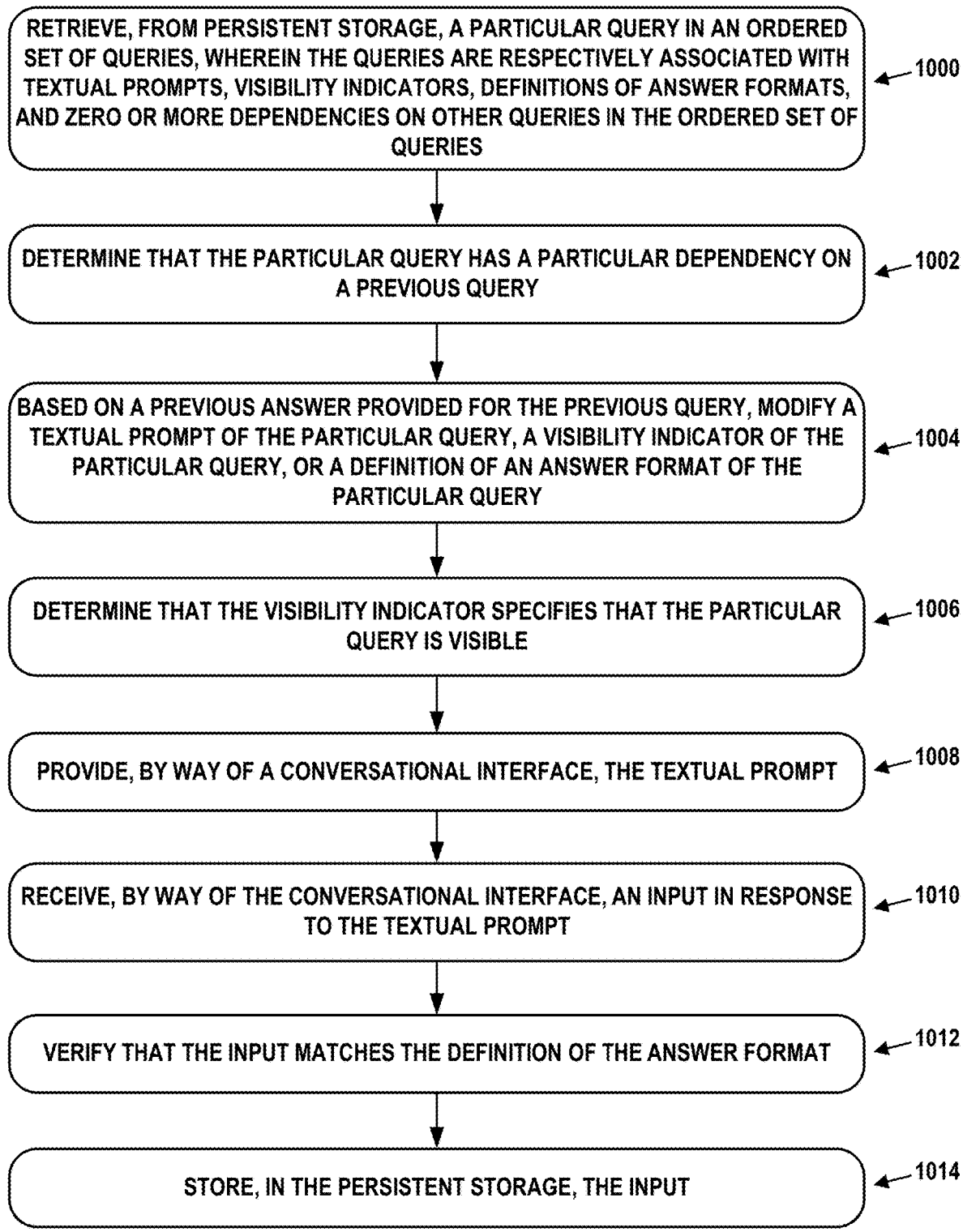
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve retrieving, from persistent storage, a particular query in an ordered set of queries, wherein the queries are respectively associated with textual prompts, visibility indicators, definitions of answer formats, and zero or more dependencies on other queries in the ordered set of queries.

Block 1002 may involve determining that the particular query has a particular dependency on a previous query.

Block 1004 may involve, possibly based on a previous answer provided for the previous query, modifying a textual prompt of the particular query, a visibility indicator of the particular query, or a definition of an answer format of the particular query.

Block 1006 may involve determining that the visibility indicator specifies that the particular query is visible.

Block 1008 may involve providing, by way of a conversational interface, the textual prompt.

Block 1010 may involve receiving, by way of the conversational interface, an input in response to the textual prompt.

Block 1012 may involve verifying that the input matches the definition of the answer format.

Block 1014 may involve storing, in the persistent storage, the input.

In some embodiments, each of the queries is stored as an entry of a database table, wherein retrieving the particular query from the persistent storage comprises retrieving the particular query from the database table.

In some embodiments, the definition of the answer format specifies that the input provided in response to the textual prompt must match one or more fields of a pre-determined database table, wherein verifying that the input matches the definition of the answer format comprises locating the input in the one or more fields.

In some embodiments, the definition of the answer format specifies that the input provided in response to the textual prompt must match a member of a pre-determined list of possible inputs, wherein verifying that the input matches the definition of the answer format comprises locating the input in the pre-determined list of possible inputs.

In some embodiments, the definition of the answer format specifies that the input provided in response to the textual prompt is a file upload, and wherein receiving the input in response to the textual prompt comprises receiving an uploaded file.

In some embodiments, the particular dependency is a Boolean conditional expression on at least part of the previous answer.

Some embodiments may further involve: retrieving, from the persistent storage, a second particular query, wherein the second particular query is associated with a second textual prompt and a second visibility indicator; determining that the second visibility indicator specifies that the second particular query is not visible; and refraining from providing, by way of the conversational interface, the second textual prompt.

Some embodiments may further involve: retrieving, from the persistent storage, a second particular query, wherein the second particular query is associated with a second textual prompt, a second visibility indicator, and a second definition of a second answer format; determining that the second visibility indicator specifies that the particular query is visible; providing, by way of the conversational interface, the second textual prompt; receiving, by way of the conversational interface, a second input in response to the second textual prompt; determining that the second input does not match the second definition of the second answer format; providing, by way of the conversational interface, a further prompt that allows selection of a further answer from a menu of options; receiving, by way of the conversational interface, a further input in response to the further prompt; and storing, in the persistent storage, the further input.

In some embodiments, the queries are also respectively associated with mandatory indicators. These embodiments may further involve: retrieving, from the persistent storage, a second particular query, wherein the second particular query is associated with a second textual prompt and a mandatory indicator; determining that the mandatory indicator specifies that the second particular query is not mandatory; and providing, by way of the conversational interface, the second textual prompt with an option to skip providing an answer.

In some embodiments, the conversational interface is implemented as part of an instant messenger, messaging application, social networking application, chat bot, virtual agent, or web-based chat interface.

Some embodiments may further involve determining that the ordered set of queries does not contain any in which an earlier query in the ordered set of queries has a dependency on a later query in the ordered set of queries.

Some embodiments may further involve generating a representation of a web page from the ordered set of queries, wherein the representation includes the textual prompts and corresponding input mechanisms of the queries for which the associated visibility indicators specify that they are visible.

VIII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing an ordered set of queries, wherein the queries are respectively associated with textual prompts, visibility indicators, definitions of answer formats, and zero or more dependencies referencing other queries in the ordered set of queries, and wherein the queries are also respectively associated with mandatory indicators; and
   one or more processors configured to iterate through the ordered set of queries, and:
      retrieve, from the persistent storage, a particular query in the ordered set of queries;
      determine that the particular query has a particular dependency referencing a previous query;
      based on a previous answer provided for the previous query and a conditional expression of the particular dependency, modify a visibility indicator of the particular query and determine that the visibility indicator as modified specifies that the particular query is visible;
      based on the visibility indicator as modified specifying that the particular query is visible, provide, by way of a conversational interface, a textual prompt of the particular query;
      receive, by way of the conversational interface, an input in response to the textual prompt;
      verify that the input matches a definition of an answer format of the particular query;
      store, in the persistent storage, the input,
      retrieve, from the persistent storage, a second particular query in the ordered set of queries, wherein the second particular query is associated with a second textual prompt and a mandatory indicator;
      determine that the mandatory indicator specifies that the second particular query is not mandatory; and
      provide, by way of the conversational interface, the second textual prompt with an option to skip providing an answer.

2. The system of claim 1, wherein each of the queries is stored as an entry of a database table, and wherein retrieving the particular query from the persistent storage comprises retrieving the particular query from the database table.

3. The system of claim 1, wherein the definition of the answer format specifies that the input provided in response to the textual prompt must match one or more fields of a pre-determined database table, and wherein verifying that the input matches the definition of the answer format comprises locating the input in the one or more fields.

4. The system of claim 1, wherein the definition of the answer format specifies that the input provided in response to the textual prompt must match a member of a pre-determined list of possible inputs, and wherein verifying that the input matches the definition of the answer format comprises locating the input in the pre-determined list of possible inputs.

5. The system of claim 1, wherein the definition of the answer format specifies that the input provided in response to the textual prompt is a file upload, and wherein receiving the input in response to the textual prompt comprises receiving an uploaded file.

6. The system of claim 1, wherein the particular dependency is a Boolean conditional expression on at least part of the previous answer.

7. The system of claim 1, wherein the second particular query is associated with a second visibility indicator and a second definition of a second answer format, wherein the one or more processors are further configured to:
- determine that the second visibility indicator specifies that the particular query is visible;
- receive, by way of the conversational interface, a second input in response to the second textual prompt;
- determine that the second input does not match the second definition of the second answer format;
- provide, by way of the conversational interface, a further prompt that allows selection of a further answer from a menu of options;
- receive, by way of the conversational interface, a further input in response to the further prompt; and
- store, in the persistent storage, the further input.

8. The system of claim 1, wherein the conversational interface is implemented as part of an instant messenger, messaging application, social networking application, chat bot, virtual agent, or web-based chat interface.

9. The system of claim 1, wherein prior to iterating through the ordered set of queries, the one or more processors are configured to:
- determine that the ordered set of queries does not contain any in which an earlier query in the ordered set of queries has a dependency on a later query in the ordered set of queries.

10. The system of claim 1, wherein the one or more processors are further configured to generate a representation of a web page from the ordered set of queries, wherein the representation includes the textual prompts and corresponding input mechanisms of the queries for which the associated visibility indicators specify that they are visible.

11. A computer-implemented method comprising:
- retrieving, from persistent storage, a particular query in an ordered set of queries, wherein the queries are respectively associated with textual prompts, visibility indicators, definitions of answer formats, and zero or more dependencies referencing other queries in the ordered set of queries, and wherein the queries are also respectively associated with mandatory indicators;
- determining that the particular query has a particular dependency referencing a previous query;
- based on a previous answer provided for the previous query and a conditional expression of the particular dependency, modifying a visibility indicator of the particular query and determining that the visibility indicator as modified specifies that the particular query is visible;
- based on the visibility indicator as modified specifying that the particular query is visible, providing, by way of a conversational interface, a textual prompt of the particular query;
- receiving, by way of the conversational interface, an input in response to the textual prompt;
- verifying that the input matches a definition of an answer format of the particular query;
- storing, in the persistent storage, the input;
- retrieving, from the persistent storage, a second particular query in the ordered set of queries, wherein the second particular query is associated with a second textual prompt and a mandatory indicator;
- determining that the mandatory indicator specifies that the second particular query is not mandatory; and
- providing, by way of the conversational interface, the second textual prompt with an option to skip providing an answer.

12. The computer-implemented method of claim 11, wherein the definition of the answer format specifies that the input provided in response to the textual prompt must match one or more fields of a pre-determined database table, and wherein verifying that the input matches the definition of the answer format comprises locating the input in the one or more fields.

13. The computer-implemented method of claim 11, wherein the definition of the answer format specifies that the input provided in response to the textual prompt must match a member of a pre-determined list of possible inputs, and wherein verifying that the input matches the definition of the answer format comprises locating the input in the pre-determined list of possible inputs.

14. The computer-implemented method of claim 11, wherein the definition of the answer format specifies that the input provided in response to the textual prompt is a file upload, and wherein receiving the input in response to the textual prompt comprises receiving an uploaded file.

15. The computer-implemented method of claim 11, wherein the second particular query is associated with a second visibility indicator and a second definition of a second answer format, the computer-implemented method further comprising:
- determining that the second visibility indicator specifies that the particular query is visible;
- receiving, by way of the conversational interface, a second input in response to the second textual prompt;
- determining that the second input does not match the second definition of the second answer format;
- providing, by way of the conversational interface, a further prompt that allows selection of a further answer from a menu of options;
- receiving, by way of the conversational interface, a further input in response to the further prompt; and
- storing, in the persistent storage, the further input.

16. An article of manufacture including a non-transitory computer-readable medium, having stored thereon program instructions that, upon execution by a computing system, cause the computing system to perform operations comprising:
- retrieving, from persistent storage, a particular query in an ordered set of queries, wherein the queries are respectively associated with textual prompts, visibility indicators, definitions of answer formats, and zero or more dependencies referencing other queries in the ordered set of queries, and wherein the queries are also respectively associated with mandatory indicators;
- determining that the particular query has a particular dependency referencing a previous query;
- based on a previous answer provided for the previous query and a conditional expression of the particular dependency, modifying a visibility indicator of the particular query and determining that the visibility indicator as modified specifies that the particular query is visible;
- based on the visibility indicator as modified specifying that the particular query is visible, providing, by way of a conversational interface, a textual prompt of the particular query;
- receiving, by way of the conversational interface, an input in response to the textual prompt;
- verifying that the input matches a definition of an answer format of the particular query;

storing, in the persistent storage, the input;
retrieving, from the persistent storage, a second particular query in the ordered set of queries, wherein the second particular query is associated with a second textual prompt and a mandatory indicator;
determining that the mandatory indicator specifies that the second particular query is not mandatory; and
providing, by way of the conversational interface, the second textual prompt with an option to skip providing an answer.

* * * * *